INVENTOR
ASGER T. NIELSEN
BY
Strauch, Nolan, Neale, Nies & Bronaugh
ATTORNEYS

INVENTOR
ASGER T. NIELSEN
BY
Strauch, Nolan, Neale, Nies & Bronaugh
ATTORNEYS

INVENTOR
ASGER T. NIELSEN

BY
Strauch, Nolan, Neale, Nies & Bronaugh
ATTORNEYS

INVENTOR

ASGER T. NIELSEN

BY

Strauch, Nolan, Neale, Nies & Bronaugh

ATTORNEYS

INVENTOR
ASGER T. NIELSEN

Strauch, Nolan, Neale, Nies & Kurz
ATTORNEYS 3,544,835
DIGITALLY CONTROLLED GENERATION OF A TRACE Asger T. Nielsen, El Cajon, Calif., assignor, by mesne assignments, to Ametek, Inc., New York, N.Y., a corporation of Delaware Filed Apr. 15, 1966, Ser. No. 542,975
Int. Cl. H01j *29/52, 29/72*
U.S. Cl. 315—22 10 Claims

ABSTRACT OF THE DISCLOSURE

A line generator including a cathode ray tube and digitally controlled circuitry for so controlling the sweep of the cathode ray beam as to produce a generally uniform trace of specified length and direction.

This invention pertains to line generators and in its broader aspect, deals with improved method and apparatus for translating a medium, having at least two degrees of movement, from one set of coordinates to another at a constant velocity along parallel paths and at substantially constant velocity along diverse paths.

More specifically, the invention pertains to an improved control for a cathode ray beam in its sweep from one point to another, as it traces a line based on digital data input, said input giving the length and direction of the line.

An improved trace is produced on the cathode ray tube by maintaining constant or substantially constant beam velocity. Thus, upon receipt of data from an external source, such as a computer, control tape, manipulative input or the like, in terms of XY coordinates, this device determines ΔX and ΔY values, selects the larger of the two and applies an appropriate signal to the ramp control circuits of a CRT to determine ramp generation rate in inverse ratio to the larger of said increments. As will be more fully explained below, this will hold the CRT beam velocity constant for parallel lines of whatever length or direction, and within a narrow range for lines of different directions. The constant, or substantially constant velocity will result in a trace of more uniform light intensity than is attainable by prior art devices.

Further, an improved, higher degree of linearity is attained by the instant invention since the same ramp control signal is applied to both the X and Y deflecting circuits of the cathode ray tube.

An improved degree of accuracy in the race obtained on the cathode ray tube is attained by utilizing a digital computing system which controls a binary weighted feedback resistor network in determining the rate of change of the ramp signal. Also, an improved end-point accuracy is obtained in the present device by operating the ramp generator between 0 and +10 volts for all segment lengths and directions.

It is the primary object of this invention, therefore, to produce a line generator which will respond to digital input, and which will develop displacement of substantially constant velocity over its translation span, independent of the length of the line generated.

It is a further and more specific object of this invention, to provide a cathode ray tube line generator wherein a given set of line traces is produced at a constant velocity and consequent uniform light intensity.

A still further object of this invention is to provide a digital computing network as an adjunct of the beam control circuit in attaining the aforesaid line trace of uniform light intensity.

Still another object is to attain a high degree of accuracy in the end point of a line generated on the cathode ray tube.

A still further and important object of this invention resides in the method employed in the attainment of improved line generation on a cathode ray tube by the use of digital computing circuits and determination of superiority in directional components of the line to be generated.

Other and more specific objects will become apparent from the description below and the accompanying drawings, in which:

FIGS. 1A and 1B, taken together, show a block diagram of the digital data responsive components of the invention.

The line generator of this invention is an output device for use in high speed and high accuracy, graphic display. It comprises a CRT system which accepts digital information as input and provides analog outputs in the form of straight lines, between pairs of points, for visual observation or photographic recording. With a CRT format of 1024×1024, it is capable of operating in excess of 10,000 lines per second; it lends itself especially to high quality photographic work where variations in light intensity must be held to a minimum, and clarity of line definition is essential.

The equipment disclosed herein accepts digital information from a computer, a preformed tape or like source, which information defines line start and stop coordinates (addresses), at 96 microsecond intervals, and is capable of drawing a full scale line in 60 microseconds. The information input may be in straight binary code with a CRT format of 1024×1024, or in binary decimal code with a 1000×1000 format.

Figure 1A:
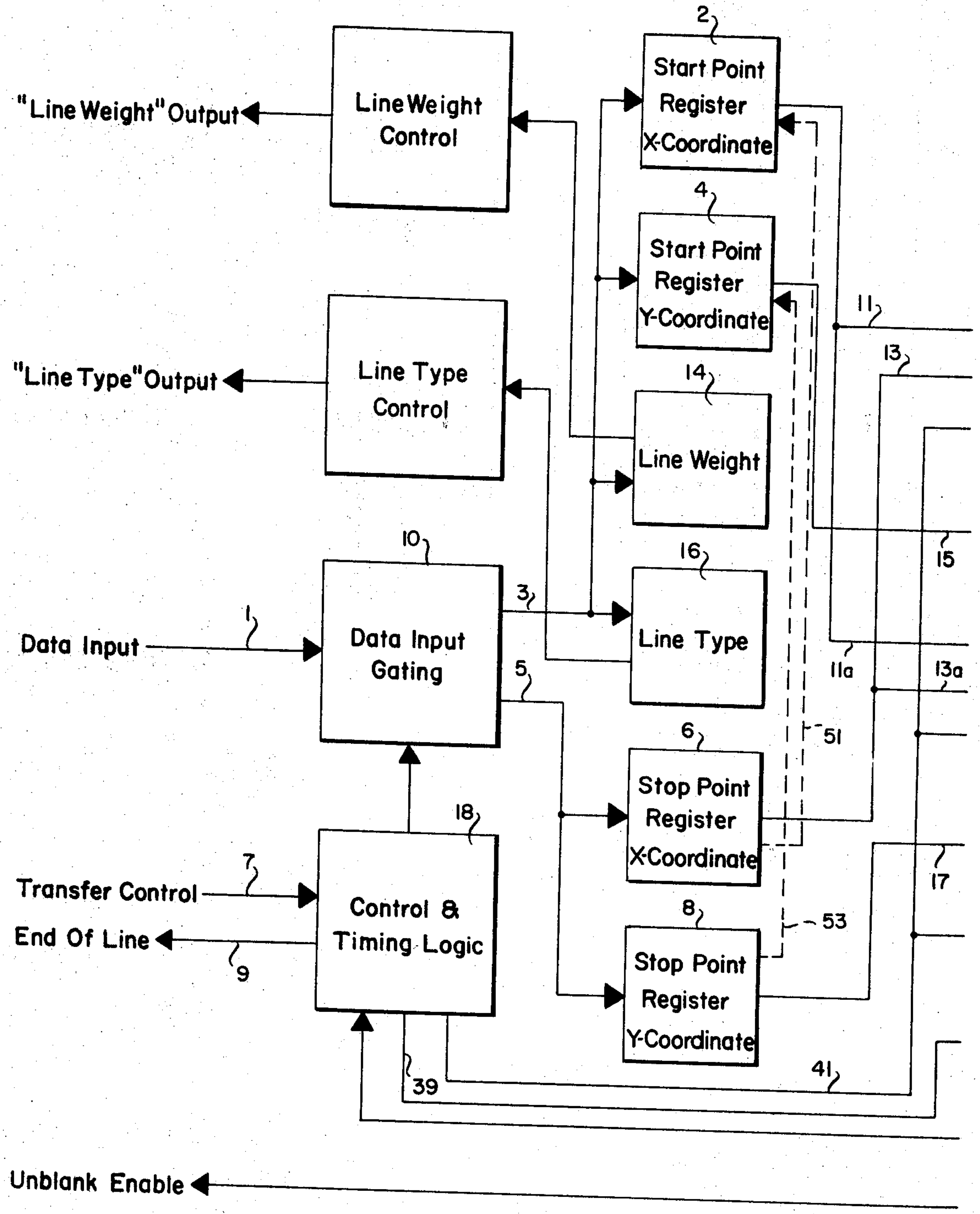
Figure 1B:
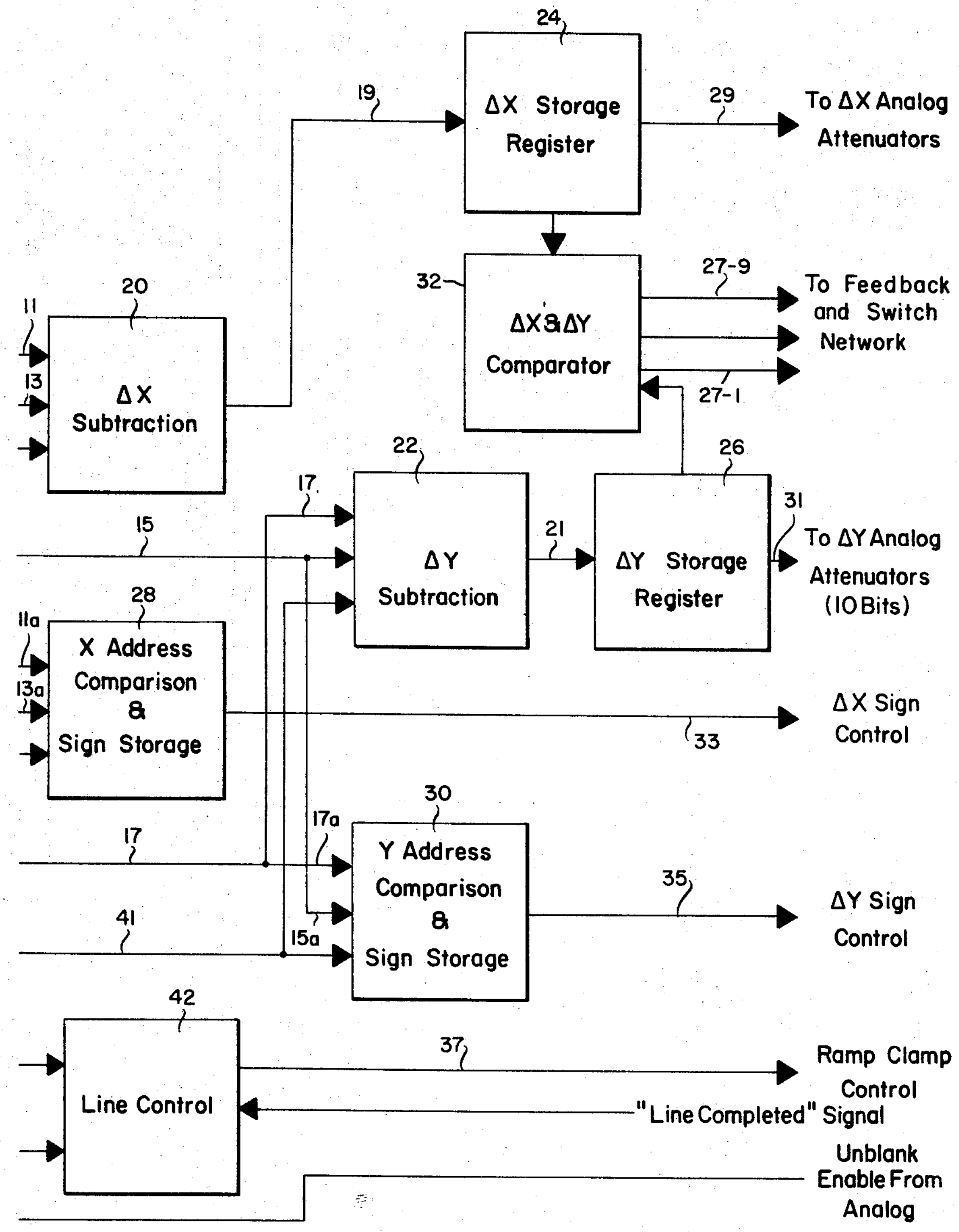

Referring to FIGS. 1A and 1B, the digital processing portion of the equipment comprises start point registers 2 and 4, for receiving the starting point designations (known as addresses) by their X and Y coordinates respectively. Stop point coordinates (addresses) X and Y are entered into registers 6 and 8 respectively. The entries are controlled by gate 10, which is interposed between the external input 1 and circuits 3 and 5 extending to the registers. In addition to the coordinate data receiving registers, the data input gate transmits external signals to registers 14 and 16, which serve to receive information signifying line weight (light, medium, heavy, etc.) and line type (solid, broken, etc.), respectively.

All of the registers in the digital portion of the line generator (FIGS. 1A and 1B) are of solid state. The coordinate point registers 2, 4, 6 and 8 have a capacity of eleven bits each, while registers 14 and 16 handle all requisite information by combinations of two bits.

A control and timing logic unit 18 serves to determine the sequence of operation of the line generator and to receive control signals ("transfer control") from the external device, as well as to transmit completion signals to the latter ("end of line") via lines 7 and 9, respectively. It's direct supervision over the distinct digital units of FIGS. 1A and 1B is effected over the circuit generally designated 41.

Upon receipt of the coordinate data by registers 2, 4, 6 and 8, the control and timing unit 18 initiates a subtraction operation in ΔX subtraction unit 20 and ΔY subtraction unit 22; e.g., the ΔX subtraction unit subtracts the X stop coordinate from the X start coordinate, while the ΔY subtraction unit effects a like subtraction of the Y stop coordinate from the Y start coordinates. Flow connections from the respective coordinate registers and subtractors are identified by numerals 11, 13, 15 and 17.

As a result of the subtraction, the values of ΔX and ΔY become available at storage registers 24 and 26, respectively. As will be readily understood, the ΔX and ΔY values characterize the length of the line to be traced by the CRT in terms of its X and Y components. The transfer of ΔX and ΔY values from the respective subtraction devices to storage registers 24, 26 is effected via circuits 19 and 21, respectively.

In the event the X start coordinate is greater than the X stop coordinate, the condition is determined and stored in X address comparison unit 28, and similarly, comparison of Y start and stop coordinates is effected and the sign is stored in Y address comparison unit 30. The signs in comparison units 28 and 30 serve to determine the direction of the line on the CRT from its starting point. With the starting point at the intersection of X and Y coordinates, these signs will determine the quadrant in which the line will appear. The circuit connections from the X coordinate registers 2 and 6 to X address comparison unit 28 are designated by numerals 11*a* and 13*a*, respectively, while those from Y coordinate registers 4 and 8 to Y address comparison unit 30—by 17*a* and 15*a*.

Having determined and stored the ΔX and ΔY coordinate values in registers 24 and 26, their magnitudes are next compared by comparator 32, which then transmits the larger of the two values to feedback and switch network 36 in the analog portion of the line generator (FIG. 2), over circuit 27. In the embodiment disclosed herein the ΔX and ΔY storage registers 24, 26 have a capacity of ten bits each, while the ΔX and ΔY comparator 32 has a capacity of nine bits, the more significant bits being the ones compared. The output of the ΔX register is fed to X attenuator 34 (FIG. 2) via circuit 29, while the output of the ΔY register 26 is supplied to Y attenuator 55 via circuit 31.

Figure 2:
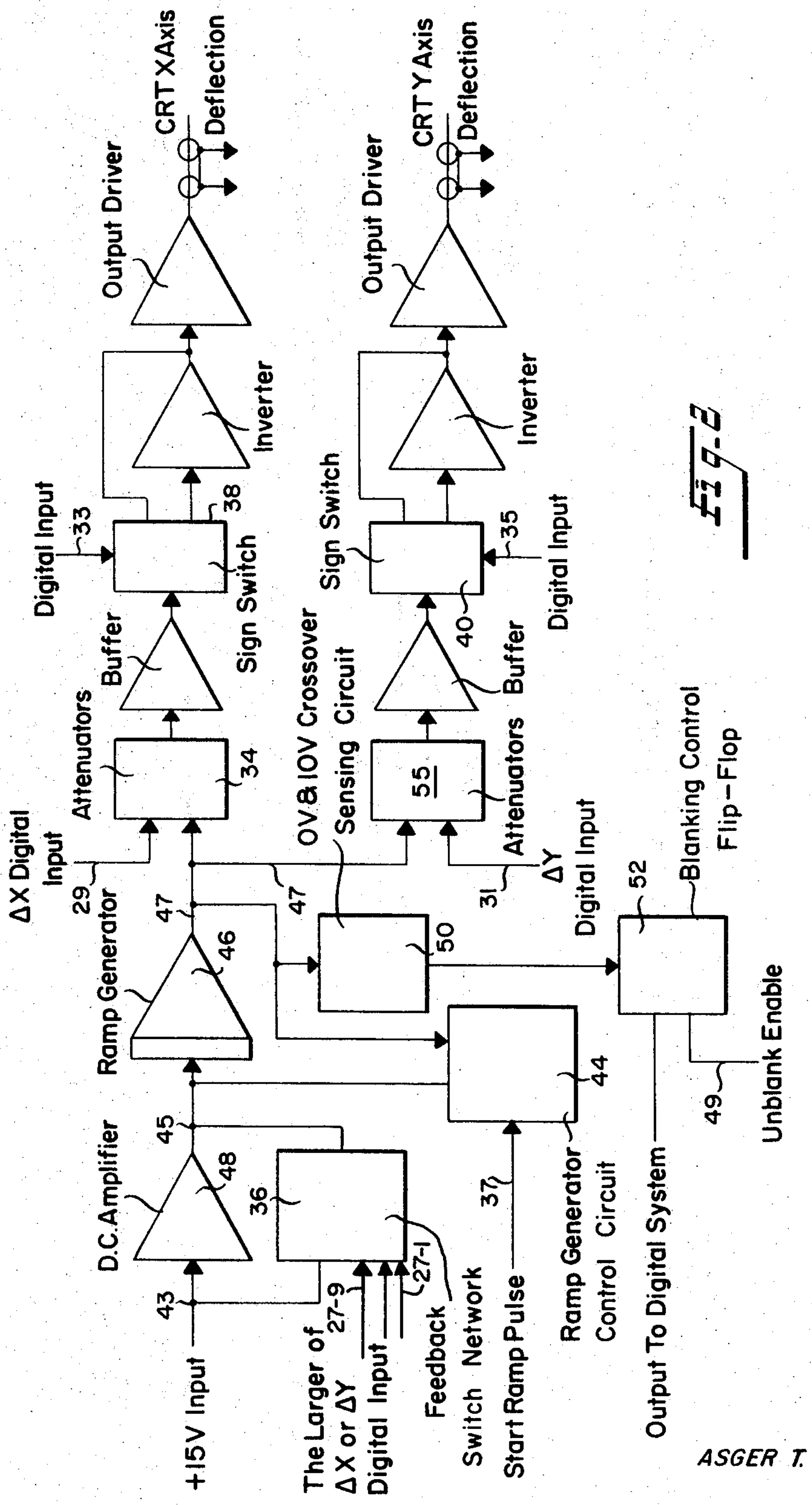
FIG. 2 is a block diagram of the analog components controlling the XY beam displacement in accordance with results derived from the organization of FIGS. 1A and 1B.

In addition to the ΔX and ΔY values, and the larger one of the two, transmitted from the digital portion of the line generator (FIGS. 1A, 1B) to the analog portion thereof (FIG. 2), as explained in the preceding paragraph, the ΔX sign and ΔY sign signals are forwarded from units 28 and 30, via circuits 33 and 35 respectively, to sign switch units 38 and 40 (FIG. 2). A further ramp clamp control signal is transmitted from digital line control unit 42 of FIG. 1B to ramp generator control circuit 44 of FIG. 2, over line 37. As will be apparent from FIGS. 1A and 1B, the transmission of the latter signal is supervised by the control and timing logic unit 18, which is connected to control unit 42 by line 39.

Referring to FIG. 2, the ramp signal is generated by ramp generator 46 whose input voltage at 45 is varied inversely proportionally to the larger of the values ΔX or ΔY of the line to be generated. This input voltage is provided by a DC amplifier 48 coupled to feedback and switch network 36, which latter receives a digital input corresponding to the larger of the ΔX or ΔY value for a given line, as previously explained. More specifically, as will be apparent from FIG. 5, the resistors R36–1—R36–9 in feedback and switch network 36 can be equated to a single theoretical resistor, $R_f$ having a value equal to the combined resistances of network 36. From conventional operational amplifier theory, $$E_o = E_{in}\frac{Rf}{R_{in}}$$

wherein:

$R_{in}$ is the resistance of the resistor R54 in series with amplifier 48,
$E_{in}$ is the input voltage to amplifier 48, and
$E_o$ is the output voltage from amplifier 48.

From the foregoing it is apparent that if network 36 is designed so that its resistance $R_f$ can be varied as an inverse function of the length of the line to be drawn, $E_o$ will also be inversely proportional to the length. This is of course accomplished by adding or subtracting resistors R36–1—R36–9 to vary the network resistance $R_f$ in accordance with the signals transmitted to the network over input lines 27 from ΔX and ΔY comparator 32.

In conjunction with the foregoing the feedback switches S36–1—S36–9 in series with the resistors R36–1—R36–9 are nothing more than conventional solid state, single pole, double throw switches, only one of which is shown in any detail. Under the control of the signals received over the associated input lines 27, these switches either connect the associated resistor to ground or to the output side of amplifier 48 and, accordingly, apply either no voltage or the output voltage $E_o$ of amplifier 48 to the resistor to which they are serially connected.

Figure 5:
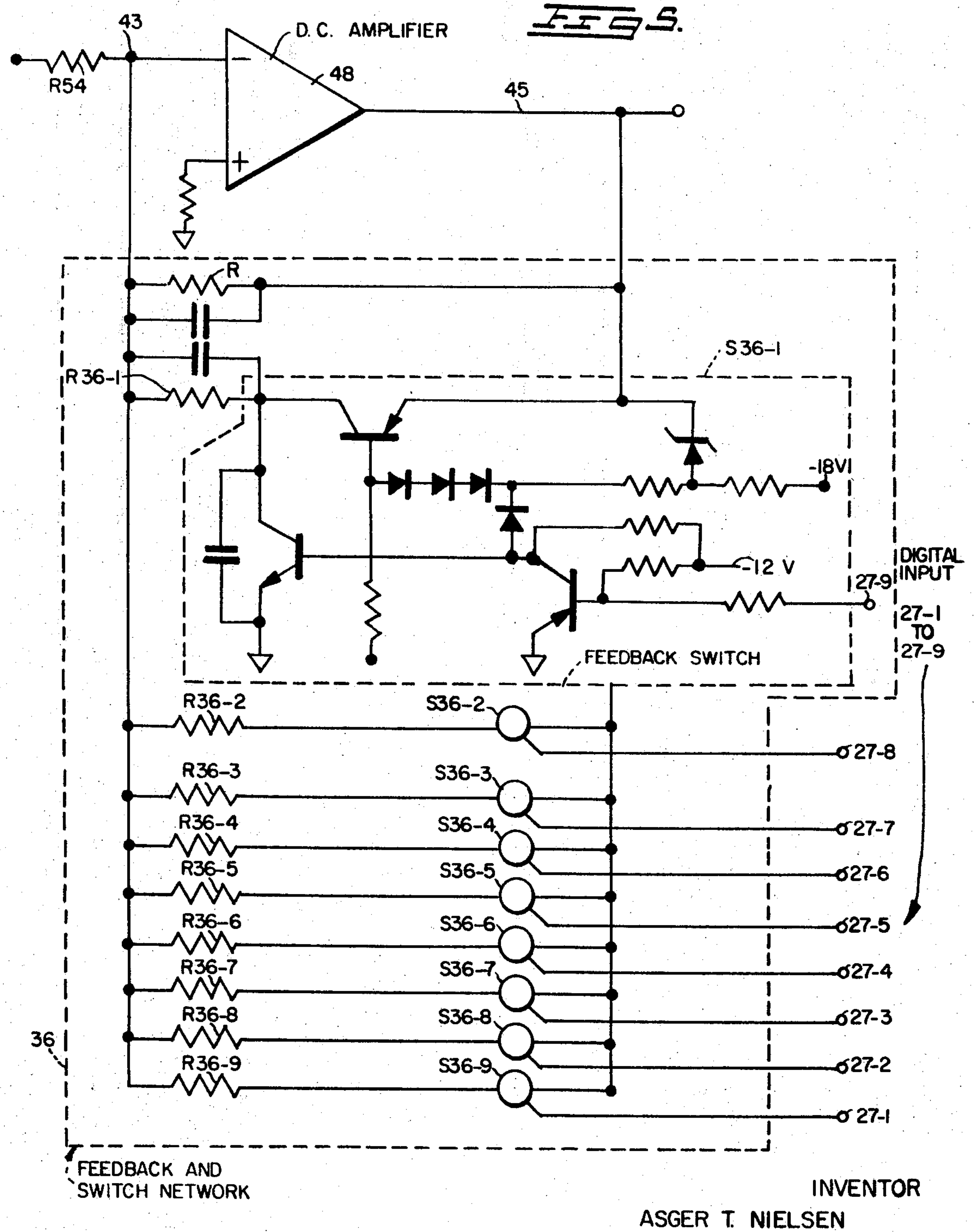
FIG. 5 is a detail diagram of the DC Amplifier and the Feedback and Switch Network included in blocks 48 and 36, respectively, of FIG. 2.

Operational amplifier theory dictates that the summing junction of an amplifier (43 in FIGS. 2 and 5) be driven to the same potential as the positive amplifier input which is grounded as shown in FIG. 5. Therefore, if ground is applied to any of the resistors R36–1—R36–9, no current will flow through it, and it will have no effect on the output voltage $E_o$ of amplifier 48 since it will not increase the total resistance $R_f$ of network 36. Thus, by using the digital input signals from lines 27 to control the network switches S36–1—S36–9 so that different resistors R36 are connected to the amplifier output, the apparent resistance $R_f$ of the network, and accordingly, the amplifier output voltage can be readily varied in such fashion that the latter will be inversely proportional to the larger of the ΔX and ΔY co-ordinates.

Weighted values are assigned to resistors $R_{in}$, R, and R36–1—R36–9 as discussed above so that $R_f$ can be varied in such a fashion that $E_o$ will satisfy the gain equation set forth (see column — lines —). For the 1024 bit format referred to (see column — lines —) proportional resistances which satisfy the gain equation just mentioned are:

| | |
|---|---|
| $R_{in}$ | 3R |
| R | 2R |
| **R36–1** | **R/128** |
| **R36–2** | **R/64** |
| **R36–3** | **R/32** |
| **R36–4** | **R/16** |
| **R36–5** | **R/8** |
| **R36–6** | **R/4** |
| **R36–7** | **R/2** |
| **R36–8** | **R** |
| **R36–9** | **2R** |

The following table shows the actual line length, amplifier gain, $E_o$, and equivalent network resistance $R_f$ for typical lines generatable in the 1024 bit format just mentioned:

| Actual line length | | Amplifier gain | $E_o$ (V) | $R_f$ |
|---|---|---|---|---|
| 0 | - | −2/3 | −10.000 | 2R |
| 2 | $2^1$ | −1/3 | −5.000 | R |
| 4 | $2^2$ | −2/9 | −3.333 | 2R/3 |
| 6 | $2^2+2^1$ | −1/6 | −2.500 | R/2 |
| 8 | $2^3$ | −2/15 | −2.000 | 2R/5 |
| 10 | $2^3+2^1$ | −1/9 | −1.667 | R/3 |
| 12 | $2^3+2^2$ | −2/21 | −1.428 | 2R/7 |
| 14 | $2^3+2^2+2^1$ | −1/12 | −1.250 | R/4 |
| 16 | $2^4$ | −2/27 | −1.111 | 2R/9 |
| 24 | $2^4+2^3$ | −2/39 | −.769 | 2R/13 |
| 32 | $2^5$ | −2/51 | −.588 | 2R/17 |
| 48 | $2^5+2^4$ | −2/75 | −.400 | 2R/25 |
| 64 | $2^6$ | −2/99 | −.303 | 2R/33 |
| 96 | $2^6+2^5$ | −2/147 | −.204 | 2R/49 |
| 128 | $2^7$ | −2/195 | −.154 | 2R/65 |
| 256 | $2^8$ | −2/387 | −.078 | 2R/129 |
| 512 | $2^9$ | −2/771 | −.039 | 2R/257 |
| 1,022 | $2^9+2^8+2^7 \ldots +2^1$ | −1/768 | −.020 | 2R/256 |

From the foregoing it will be apparent that +15 volts input to the DC amplifier and feedback and switch network (as designated at 43) the voltage output at 45 will be such as to control the rate of ramp generator-integrator 46 inversely to the larger coordinate, e.g., the longer the line to be generated the lower the rate, and the longer the time of sweep, and vice versa.

The amplitude of the ramp output signal at 47 begins at approximately .8 volt below ground level and goes in a positive direction. When zero volts is reached a tunnel diode in the crossover sensing circuit 50 generates a pulse of 15 nanosecond duration, which is amplified and is used to turn on the CRT unblank flip flop in the blanking control unit 52. The unblank enable signal is emitted on line 49. As the ramp generator-integrator continues and reaches +10 volts a second tunnel diode is energized in unit 50, and the resulting pulse is utilized to turn off the unblank flip flop in unit 52. The same pulse also causes a clamp circuit to return the ramp generator to its initial state.

The speed of integration of ramp generator 46 varies from 120 nanoseconds for the shortest line to 60 microseconds for the longest. With all switches of feedback network 36 open, the gain is ⅔ (−10 volts output for +15 volts input). As the switches are closed, the gain is reduced and will satisfy the equation $$G = \tfrac{2}{3} \times \frac{1}{L+1}$$

where L is the length on the basis of a 1024 bit format. The amplitude derived is applied to the ramp generator-integrator at 45.

As will be understood from the above, the length of a given line traced by the CRT beam is determined by the time elapsed between unblank and blank pulses produced by the ramp generator as it crosses 0 volt and 10 volt outputs, respectively. Thus, if the line is to be short, the span between the signals must be short, and the ramp rate must be high. Conversely, if the line is to be long, the time between unblank and blank signals must be long, and the ramp rate must be low. The resultant sweep velocity of the CRT beam is constant.

Figure 3:
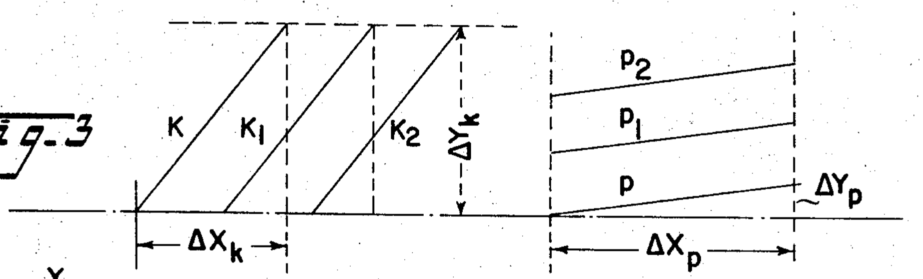
FIG. 3 illustrates the uniformity of ramp rate and velocity for parallel lines.

Referring to FIG. 3, two sets of parallel lines K, $K_1$, $K_2$ and $p$, $p_1$, $p_2$ are illustrated. As to the first of these, lines K–$K_2$, $\Delta Y_k$ (or the Y component of the line) is larger than $\Delta X_k$, and it will therefore determine the ramp rate. Since $\Delta Y_k$ is the same for all of the K lines, the ramp rate will be the same (proportional to $1/\Delta Y_k$), as will be the beam velocity and the resultant luminescence, for all of them.

In the case of lines $p$–$p_2$ of FIG. 3, $\Delta Xp$ (being larger than $\Delta Yp$) will determine the ramp rate, and the beam velocity and luminescence will be the same for each of these lines. However, they will not be the same as for the lines of the K set because of the difference in angularity between the lines of the two sets.

Figure 4:
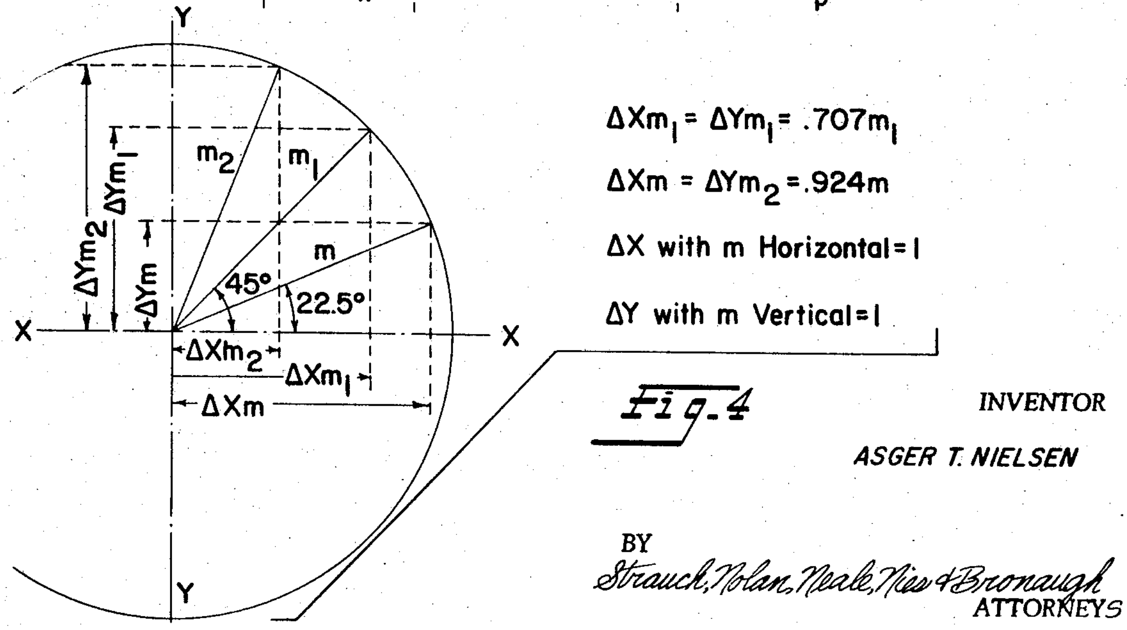
FIG. 4 illustrates the effect of line angularity on CRT ramp rate and beam velocity.

This may be further clarified with reference to FIG. 4, which shows lines $m$, $m_1$, and $m_2$ of the same length but at various angles from the reference axis—e.g., 22.5°, 45° and 67.5° from horizontal, respectively. Bearing in mind that the larger of the X or Y components of a given line controls the ramp rate, it will be apparent that neither of them can be less than .707 M (which is sin or cos of 45°), nor can the larger of them exceed $m$ when the line is horizontal or vertical. Taking $m$ as equal to unity, the ramp rate may then vary between 1/.707 and 1 (or 1.4, and 1) depending on the angularity of a line to be traced. However, it will remain inversely proportional to the length of X or Y component of a line, whichever is the larger, as long as the line direction is the same. Thus, the ramp rate for $m_1$ in FIG. 4 will be $1/.707m_1$; if line $m_1$ should be doubled in length, the rate will obviously be proportional to $1/.707(2m_1)$ etc. Moreover, the ramp rate will approach uniformity the closer the lines traced come to horizontal or vertical; it will be highest for lines running at 45° in any of the four quadrants. Accordingly, all other factors being equal lines running at 45° will be traced faster than those which are horizontal or vertical, and their luminescence will be somewhat lower, accordingly. As the lines traced approach vertical or horizontal, the tracing speed and luminescence approach a constant.

While the input to the line generator described above contemplates dual input of start and stop coordinates for each line, it is obvious that only a single set of coordinates (stop values) could be entered for each new line to be traced, while the stop coordinates of the previous line could serve as the start coordinates for the new one. The transfer from Stop Point Registers 6 and 8, to Start Point Registers 2 and 4, respectively (FIG. 1A) is effected over circuits 51 and 53 under appropriate control of Data Input Gating unit 10.

What is claimed and desired to be secured by Letters Patent is:

1. In a device for controlling the displacement of the sweep of a cathode ray tube, means for receiving the starting and stopping data for said displacement, means for determining the extent and direction of displacement from said data, means for determining a dominant characteristic of said displacement which is a function of the extent and direction thereof, and means including a ramp generator responsive to said dominant characteristic for controlling the rate of said displacement.

2. A device according to claim 1, wherein the starting and stopping data received is in the form of XY coordinates, and wherein the dominant characteristic determined is the larger of the X or Y components of the displacement required.

3. A device according to claim 1, wherein the rate controlling means is cyclically operable once for each displacement, and wherein the means for receiving the starting and stopping data initiates and terminates displacement at fixed points in each cycle.

4. A device according to claim 1, wherein the dominant characteristic of the desired displacement is the larger of the X and Y components thereof, and wherein the means for controlling the displacement rate is arranged to control said rate inversely with respect to the larger of said components.

5. In a cathode ray tube line generator, digital control means comprising registers for receiving start and stop data, means for determining the digital magnitude and direction of the line to be generated under control of said registers, means for determining the combined dominant characteristic of said magnitude and direction, a ramp generator capable of variable rates of operation, and means responsive to the dominant characteristic determining means to control the rate of said ramp generator inversely with said dominant characteristic.

6. In a cathode ray tube line generator as in claim 5, wherein the start and stop data is received in the form of rectangular coordinates, wherein there are two start registers and two stop registers for receiving the respective X and Y coordinates, wherein the means for determining magnitude and direction comprise ΔX and ΔY subtractors to obtain the X and Y components of the line to be generated, and X and Y comparison devices to determine the algebraic signs of said X and Y dimensions, and wherein the means for determining the dominant characteristic comprises means for determining the larger of said X and Y dimensions, a D.C. amplifier and a feedback and switch network, and means for transmitting the larger of said X or Y values to said network, said amplifier and network comprising the means to control the rate of said ramp generator.

7. A cathode ray tube line generator according to claim 6, having separate X and Y beam deflection circuits, an attenuator in each of said circuits, and means for controlling both of said attenuators from said ramp generator.

8. A cathode ray tube line generator according to claim 7, wherein said separate X and Y deflection circuits each include sign switch means and inverter means, and wherein said last switch means is controlled by the respective X and Y sign comparison means.

9. A cathode ray tube line generator according to claim 6, in which the ramp generator is cyclically operated and including means for providing unblank and blank signals at fixed points in the cycle of the ramp generator, all lines being generated in the periods between the unblank and succeeding unblank signals, whereby the ramp generator rate is greater for shorter lines and lower for longer lines, thereby giving a substantially uniform speed per unit length of line generated.

10. The method of generating lines on a cathode ray tube screen by controlling a cathode ray beam comprising the steps of (1) receiving data indicative of the start and stop addresses of a line (2) determining the major dimensional and directional characteristics of said line (3) developing start and stop signals for enabling and disabling said beam to effect line tracing on the screen (4) and controlling the rate at which said start and stop signals are developed inversely to the major dimensional characteristic whereby substantially constant velocity and resultant uniform luminescence are attained.

References Cited

UNITED STATES PATENTS

| | | | |
|---|---|---|---|
| 3,329,928 | 7/1967 | Halsted | 315—18 X |
| 3,364,479 | 1/1968 | Henderson et al. | 315—22 X |
| 3,333,147 | 7/1967 | Henderson | 315—22 |
| 3,434,135 | 3/1969 | Granberg et al. | 315—18 X |

RODNEY D. BENNETT, Primary Examiner

T. H. TUBBESING, Assistant Examiner

U.S. Cl. X.R.

315—24

UNITED STATES PATENT OFFICE

CERTIFICATE OF CORRECTION

Patent No. 3,544,835 Dated December 1, 1970

Inventor(s) A. T. NIELSEN

It is certified that error appears in the above-identified patent and that said Letters Patent are hereby corrected as shown below:

Column 4, lines 37 and 38, the blanks should be filled in as follows:

Column --5--, lines --24, 25, 26--

Signed and sealed this 23rd day of March 1971.

(SEAL)
Attest:

EDWARD M. FLETCHER, JR.
Attesting Officer

WILLIAM E. SCHUYLER, JR.
Commissioner of Patents

UNITED STATES PATENT OFFICE

CERTIFICATE OF CORRECTION

Patent No. 3,544,835 Dated December 1, 1970

Inventor(s) A. T. NIELSEN

It is certified that error appears in the above-identified patent and that said Letters Patent are hereby corrected as shown below:

Column 4, lines 37 and 38, the blanks should be filled in as follows:

Column --5--, lines --24, 25, 26--

Signed and sealed this 23rd day of March 1971.

(SEAL)
Attest:

EDWARD M. FLETCHER, JR.
Attesting Officer

WILLIAM E. SCHUYLER, JR.
Commissioner of Patents